United States Patent

[11] 3,619,370

| [72] | Inventors | Leonard M. Weinstock<br>Rocky Hill;<br>Roger J. Tull, Metuchen; Dennis M.<br>Mulvey, Iselin, all of N.J. |
|------|-----------|---|
| [21] | Appl. No. | 818,086 |
| [22] | Filed | Apr. 21, 1969 |
| [45] | Patented | Nov. 9, 1971 |
| [73] | Assignee | Charles E. Frosst & Co. |

[54] MICROBIAL REDUCTION OF THIADIAZOLES
3 Claims, No Drawings

[52] U.S. Cl..................................................... 195/51,
260/247.1
[51] Int. Cl..................................................... C12d 13/00
[50] Field of Search........................................... 195/51, 28

[56] References Cited
UNITED STATES PATENTS

| 2,866,736 | 12/1958 | Camerino et al. ............ | 195/51 |
| 3,312,598 | 4/1967 | Rosi et al. .................... | 195/51 |

*Primary Examiner*—Alvin E. Tanenholtz
*Attorneys*—Erma R. Coutts, Harry E. Westlake, Jr. and I. L. Wolk

ABSTRACT: Process is described for reducing a 3-substituted-4-(3-amino-2-oxopropoxy)-1,2,5-thiadiazole chemically with sodium borohydride or aluminum alkoxide or by use of a bacterial, actinomycetales or fungal reductase to provide a 3-substituted-4-(3-amino-2-hydroxypropoxy)-1,2,5-thiadiazole that exhibits $\beta$-adrenergic blocking properties and therefore useful, inter alia, in treatment of angina pectoris.

MICROBIAL REDUCTION OF THIADIAZOLES

This invention is concerned with a novel method for preparing 3-X-4-(3-substituted amino-2-hydroxypropoxy)-1,2,5-thiadiazole products that exhibit β-adrenergic blocking properties and are thus useful in the management of angina pectoris.

The process of this invention comprises the reduction of a 3-X-4-(3-substituted amino-2-oxoproxy)-1,2,5-thiadiazole. Reduction of the ketonic function can be effected chemically with sodium borohydride or aluminum alkoxide or reduction can be effected by fermentation with a reductase of bacterial, actinomycetales or fungal origin. In the latter system (i.e., a reductase) the sinister isomer of the desired 3-X-4-(3-substituted amino-2-hydroxypropoxy)-1,2,5-thiadiazole is obtained.

Chemical reduction advantageously is effected in the presence of an organic solvent such as a lower alkanol or other polar aprotic organic solvents such as dimethylformamide (DMF), dimethyl sulfoxide (DMSO), tetrahydrofuran (THF), hexamethylphosphoramide (HMP) and the like. When sodium borohydride is employed as the reducing agent, it is preferred that it be added portionwise as the reaction is exothermic. Excess sodium borohydride subsequently is destroyed by the addition of concentrated mineral acid, advantageously hydrochloric acid; the end point for the addition of acid is reached when the mixture remains acidic.

Reduction with a reductase is accomplished by inoculating the proper culture medium with the selected organism and permitting the culture to stand at 28° C. until good growth is observed to have occurred. For the fungi and actinomycetales this will take about 5 days and for the bacterial reductase from about 2 to 3 days. The 3-X-4-(3-substituted amino-2-oxopropoxy)-1,2,5-thiadiazole then is added, preferably in the form of a salt, and the medium maintained at the same temperature for an additional 1 to 3 days, preferably about 48 hours. The solid material then is removed by conventional methods, such as centrifugation or filtration, and the desired product obtained from the clarified filtrate by evaporation or other methods for removing the water.

Organisms suitable for the reduction of 3-X-4-(3-substituted amino-2-oxopropoxy)-1,2,5-thiadiazole are (1) bacterial reductase selected from

| | |
|---|---|
| Clostridium butylicum, | Bacillus megaterium, |
| C. lentoputrescens, | Cornebacterium simplex, |
| Escherichia coli, | Salmonella paratyphi, |
| E. freundii | Leuconostoc mesenteroides, |
| Aerobacter aerogenes, | Acetobacter ascendens, and |
| Mycobacterium lacticola, | Lactobacillus delbrueckii; |

(2) actinomycetales reductase selected from *Streptomyces lavendulae* and *S. coelicolor*;

and (3) fungal reductase selected from *Saccharomyces Cerevisiae Geotrichum candidum*, *Curvularia falcata* and *C. lunata*.

As media suitable to support the growth of each of these organisms is described in the literature and are well known to those skilled in the fermentation art, those teachings are relied upon herein by reference in lieu of a detailed disclosure of each of them.

The ketone starting material, 3-X-4-(3-substituted amino-2oxopropoxy)-1,2,5-thiadiazole, can be prepared by first aminating bromoacetol. The reactants are employed in the ratio of at least 2 moles of the amine of the structure $YNH_2$ to 1 mole of bromoacetol, and the reaction advantageously is carried out at ambient temperature in an aqueous medium. The 3-substituted amino-2-oxopropanol obtained then is reacted with any commercially available sulfonyl halide to form a 3-substituted amino-2-oxo-1-sulfonyloxopropane. Reaction of this substance with 3-X-4-(hydroxy-1,2,5-thiadiazole in the presence of a solvent and advantageously by heating to the reflux temperature gives 3-X-4-(3-substituted amino-2-oxopropoxy)-1,2,5-thiadiazole. The solvents employed in this step are advantageously polar aprotic organic solvents of the type hereinbefore defined. The above process can be illustrated by the following reaction scheme:

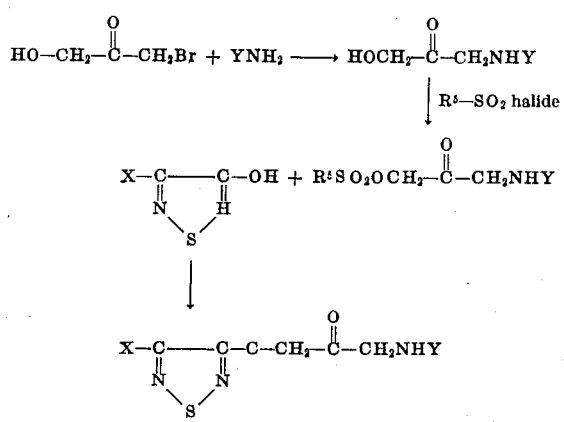

In the above reaction scheme Y is a straight or branched chain alkyl having from one to five carbon atoms which is optionally hydroxy substituted; $R^5$ is the alkyl or benzene moiety of the sulfonyl halide reactant hereinafter defined; and X represents chloro, lower alkyl having from one to three carbon atoms, lower alkoxy having from one to three carbon atoms, phenyl, benzyl, morpholino, piperidyl, hydroxypiperidyl and N-lower alkyl-piperazinyl.

In the preparation of the sulfonyloxy compounds, any sulfonyl halide can be employed as the sulfonyl moiety subsequently is removed. For practical purposes, commercially available and inexpensive sulfonyl halides could be employed and these would fall into the class of alkylsulfonyl halides and benzenesulfonyl halides where the benzene moiety can optionally be substituted with one or more similar or dissimilar substituents selected from lower alkyl, lower alkoxy, halo, amino and nitro substituents. Among the commercially available sulfonyl halides that can be employed for this purpose there can be mentioned methanesulfonyl chloride, benezenesulfonyl chloride, nitrobenzenesulfonyl chloride, bromobenzenesulfonyl chloride, chlorobenzenesulfonyl chloride, toluenesulfonyl chloride, toluenesulfonyl fluoride, trichlorobenzenesulfonyl chloride, tribromobenzenesulfonyl chloride, fluorobenzenesulfonyl chloride, 4-chloro-2(or 3)-nitrobenzenesulfonyl chloride, hexadecanesulfonyl chloride, 2-mesitylenesulfonyl chloride, methoxybenzenesulfonyl chloride, and the like.

The following examples will illustrate each of the above methods suitable for the reduction of a 3-X-4-(3-substituted amino-2-oxopropoxy)-1,2,5-thiadiazole.

PREPARATION I

Preparation of Starting Materials

3-X-4-(3-Substituted amino-2-oxopropoxy)-1,2,5-thiadiazole

Step A: Preparation of 3-tert-butylamino-2-oxopropanol

To an aqueous solution of tert-butylamine (1 mole) at ambient temperature, there is added slowly and with vigorous stirring bromoacetol (2 mole). The reaction mixture is allowed to stand at ambient temperature for about 5 hours whereupon it is made basic by the addition of sodium hydroxide. The reaction mixture then is extracted with ether, the excess amine is removed from the ethereal solution under reduced pressure and the ether then removed by evaporation to give 3-tert-butylamino-2-oxopropanol.

By replacing the tert-butylamine employed in Step A by an equivalent quantity of isopropylamine, 2,2-dimethylpropylamine and 1,1-dimethyl-2-hydroxyethylamine there is obtained, respectively, 3-isopropylamino-2-oxopropanol,
3-(2,2-dimethylpropylamino-)-2-oxopropanol, and
3-(1,1-dimethyl-2-hydroxyethylamino)-2-oxopropanol.

Step B: A solution of the 3-tert-butylamino-2-oxopropanol in a mixture of pyridine hydrochloride and pyridine is treated with p-toluenesulfonylchloride. The mixture is stirred for one-half hour at 25°–30° C. and then poured into cold water. The solution is treated with potassium carbonate and the pyridine evaporated in vacuo at a temperature between 55°–60° C. The aqueous residue is treated with potassium carbonate and the mixture extracted with methylene chloride. Evaporation of the dried extract provides 1-toluenesulfonyloxy-2-oxo-3-tert-butylaminopropane.

By replacing the 3-tert-butylamino-2-oxopropanol and the p-toluenesulfonyl chloride employed in the preceding step by the following reaction pairs:
1. 3-isopropylamino-2-oxopropanol and benzenesulfonyl chloride,
2. 3-(2,2-dimethylpropylamino)-2-oxopropanol and methylsulfonyl chloride or other lower alkylsulfonyl chloride, and
3. 3-(1,1-dimethyl-2-hydroxyethylamino)-2-oxopropanol and p-chlorophenylsulfonyl chloride, there is obtained respectively,
1. 1-benzenesulfonyloxy-2-oxo-3-isopropylaminopropane,
2. 1-methylsulfonyloxy-2-oxo-3-(2,2-dimethylpropylamino)propane or other lower alkylsulfonyloxy derivatives, and
3. 1-(p-chlorophenylsulfonyloxy)-2-oxo-3-(1,1-dimethyl-2-hydroxyethylamino)propane.

Any other sulfonyl halide, particularly (though not necessarily) any of the commercially available sulfonyl halides identified hereinabove can be employed with equal success if substituted in the process illustrated in Step B of this example for reaction with any desired 3-amino (or substituted amino)-2-oxopropanol to provide the sulfonyloxy derivative thereof which upon reaction with the appropriate 3-X-4-hydroxyl-1,2,5thiadiazole according to Step D of this example provides the desired 3-X-4-(3-amino or substituted amino-2-oxopropoxy)-1,2,5-thiadiazole. These compounds, in turn, are reduced by the methods of example 1–3 to the corresponding 2-hydroxypropoxy products.

Step C: Preparation of 3-morpholino-4-hydroxyl-1,2,5-thiadiazole 3,4-Dichloro-1,2,5-thiadiazole (0.6 mole) is added dropwise over a 30-minute period at 105°–110° C. to morpholine (2.6 mole). After the addition, the mixture is stirred 2 hours at 105°–110° C., then cooled to 15° C. and quenched with water (250 ml.). This mixture then is made acidic with concentrated hydrochloric acid (250 ml.) whereupon an insoluble oil soon crystallizes to a heavy solid mass. After crystallization is complete the solid is filtered and washed with water and then dried at 35° C. in vacuo giving a 95% yield of 3-morpholino-4-chloro-1,2,5-thiadiazole, m.p. 43°–45° C.

By replacing morpholine in the above reaction with an equivalent quantity of N-methylpiperazine, piperidine and 4-hydroxypiperidine, and then following substantially the same method there is obtained, respectively,
1. 3-(4-methylpiperazinyl)-4-chloro-1,2,5-thiadiazole,
2. 3-piperidyl-4-chloro-1,2,5-thiadiazole, and
3. 3-(4-hydroxypiperidyl)-4-chloro-1,2,5-thiadiazole.

The 3-morpholino-4-chloro-1,2,5-thiadiazole (125 g.) is added to 2.5N sodium hydroxide (1 liter) in dimethyl sulfoxide (100 ml.). The mixture is refluxed with stirring for about 3 hours and the solution then is cooled to 15° C. and made acidic with concentrated hydrochloric acid (250 ml.). The precipitated material is removed by filtration at 15° C. and slurried well with water. The solid material then is dried to constant weight thus providing 108 g. of 3-morpholino-4-hydroxy-1,2,5-thiadiazole, m.p. 198°–200°C. (dec.).

By replacing the 3-morpholino-4-chloro-1,2,5-thiadiazole employed in the above reaction by
1. 3-(4-methylpiperazinyl)-4-chloro-1,2,5-thiadiazole,
2. 3-piperidyl-4-chloro-1,2,5-thiadiazole, and
3. 3-(4-hydroxypiperidyl)-4-chloro-1,2,5-thiadiazole and following substantially the same procedure described above there is obtained the corresponding
1. 3-(4-methylpiperazinyl)-4-hydroxy-1,2,5-thiadiazole,
2. 3-piperidyl-4-hydroxy-1,2,5-thiadiazole, and
3. 3-(4-hydroxypiperidyl)-4-hydroxy-1,2,5-thiadiazole.

Step D: Preparation of 3-morpholino-4-(3-tert-butylamino-2-oxopropoxy)-1,2,5-thiadiazole The 1-toluenesulfonyloxy-2-oxo-3-tert-butylaminopropane, prepared as described in Step B, (11 mole) is added to 0.80N methanolic sodium methoxide (15 ml.) at 0° C. The mixture is stirred for 15 minutes at 0°–5° C., treated with 3-morpholino-4-hydroxy-1,2,5-thiadiazole (4.29 g.) and then refluxed for 16 hours. The solvent is evaporated in vacuo and the residue is treated with excess potassium carbonate to provide 3-morpholino-4-(3-butylamino-2-oxopropoxy)-1,2,5-thiadiazole.

EXAMPLE 1

Chemical Reduction

Preparation of 3-morpholino-4-(3-tert-butylamino-2-hydroxypropoxy)-1,2,5-thiadiazole The 3-morpholino-4-(3-tert-butylamino-2-oxopropoxy)-1,2,5-thiadiazole (0.01 mole) is dissolved in isopropanol (10 ml.). To the solution is added sodium borohydride in portions until the initial evolution of heat and gas subsides. The excess sodium borohydride is destroyed by addition of concentrated hydrochloric acid until the mixture remains acidic. The precipitate of sodium chloride is removed, ether is added, and the solution is concentrated to crystallization. The solid material is removed by filtration and dried thus providing 3-morpholino-4-(3-tert-butylamino-2-hydroxypropoxy)-1,2,5-thiadiazole, m.p. 161°–163° C. (as hydrochloride).

EXAMPLE 2

3-Morpholino-4-(3-tert-butylamino-2-hydroxypropoxy)-1,2,5-thiadiazole Hydrochloride Equimolecular quantities of aluminum isopropoxide and 3-morpholino-4-(3-tert-butylamino-2-oxopropoxy)-1,2,5-thiadiazole in dry isopropyl alcohol are refluxed on a steam bath for about 1 hour with simultaneous removal of acetone. When the distillate gives a negative test for acetone, the reaction mixture is cooled and hydrolyzed with dilute hydrochloric acid and the precipitated 3-morpholino-4-(3-tert-butylamino-2-hydroxypropoxy)-1,2,5-thiadiazole hydrochloride is separated and dried.

The isopropanol solvent employed in the above examples can be replaced by other alkanols or other polar organic solvents of the type hereinbefore described.

Similarly the product of example 2 can be prepared by replacing the aluminum isopropoxide by other aluminum alkoxides.

By replacing the 1-toluenesulfonyloxy-2-oxo-3-tert-butylaminpropane and the 3-morpholino-4-hydroxy-1,2,5-thiadiazole employed in Preparation 1, Step D, by equivalent quantities of the following reaction pairs:
1. 1-toluenesulfonyloxy-2-oxo-3-tert-butylaminopropane and 3-chloro-4-hydroxy-1,2,5-thiadiazole,
2. 1-benzenesulfonyloxy-2-oxo-3-isopropylaminopropane and 3-chloro-4-hydroxy-1,2,5-thiadiazole,
4. 1-toluenesulfonyloxy-2-oxo-3-tert-butylaminopropane and 3-ethyl-4-hydroxy-1,2,5-thiadiazole,
5. 1-(p-chlorophenylsulfonyloxy)-2-oxo-3-(1,1-dimethyl-2-hydroxyethylamino)propane and 3-ethyl-4-hydroxy-1,2,5-thiadiazole,
6. 1-benzenesulfonyloxy-2-oxo-3-isopropylaminopropane and 3-ethoxy-4-hydroxy-1,2,5-thiadiazole,
7. 1-toluenesulfonyloxy-2-oxo-3-tert-butylaminopropane and 3-ethoxy-4-hydroxy-1,2,5-thiadiazole,
8. 1-methylsulfonyloxy-2-oxo-3-(2,2-dimethylpropylamino) propane or other lower alkylsulfonyloxy derivatives and 3-ethoxy-4-hydroxy-1,2,5-thiadiazole, 9. 1-benzenesulfonyloxy-2-oxo-3-isopropylaminopropane and 3-phenyl-4-hydroxy-1,2,5-thiadiazole,
10. 1-toluenesulfonyloxy-2-oxo-3-tert-butylaminopropane and 3-phenyl-4-hydroxy-1,2,5-thiadiazole, and
11. 1-toluenesulfonyloxy-2-oxo-3-tert-butylaminopropane and 3-benzyl-4-hydroxy-1,2,5-thiadiazole, and following substantially the same procedures described in Step D of Preparation 1, followed by the process described in examples 1 and 2, as well as the modifications thereof described above, there is obtained, respectively, 1. 3-chloro-4-(3-tert-butylamino-2-hydroxypropoxy)-1,2,5-thiadiazole, m.p. 78°–79° C.,
2. 3-chloro-4-(3-isopropylamino-2-hydroxypropoxy)-1,2,5-thiadiazole, m.p. 153–5° C. (as HCl),
3. 3-ethyl-4-(3-isopropylamino-2-hydroxypropoxy)-1,2,5-thiadiazole, m.p. 144.5–145.5 (as HCl),
4. 3-ethyl-4-(3-tert-butylamino-2-hydroxypropoxy)-1,2,5-thiadiazole, m.p. 137°–138° C. (as HCl),
5. 3-ethyl-4-[3-(1,1-dimethyl-2-hydroxyethylamino)-2-hydroxypropoxy]-1,2,5-thiadiazole, m.p.125–7 (as HCl),
6. 3-ethoxy-4-(3-isopropylamino-2-hydroxypropoxy)-1,2,5-thiadiazole, m.p. 167–70 (as HCl),
7. 3-ethoxy-4-(3-tert-butylamino-2-hydroxypropoxy)-1,2,5-thiadiazole, m.p. 147–9 (as HCl),
8. 3-ethoxy-4-[3-(2,2-dimethylpropylamino)-2-hydroxypropoxy]-1,2,5-thiadiazole, m.p. 168–9 (as HCl),
9. 3-phenyl-4-(3-isopropylamino-2-hydroxypropoxy)-1,2,5-thiadiazole, m.p. 165–7 (as HCl),
10. 3-phenyl-4-(3-tert-butylamino-2-hydroxypropoxy)-1,2,5-thiadiazole, m.p. 168–170.5° C. (as HCl), and
11. 3-benzyl-4-(3-tert-butylamino-2-hydroxypropoxy)-1,2,5-thiadiazole, m.p. 122–3° C. (as HCl).

EXAMPLE 3

Reduction with a reductate

Sucrose (1 kg.) is dissolved in water (9 liters) in a 20-liter bottle equipped with a gas trap. Baker's yeast (*Saccharomyces Cerevisiae*, 1 kg.) is made into a paste with water (1 liter) and added to the sucrose solution with stirring. After lively evolution of gas begins (within 1 to 3 hours), 3-morpholino-4-(3-tert-butylamino-2-oxopropoxy)-1,2,5-thiadiazole hydrogen maleate [1.35 mole, prepared by reaction of the 3-morpholino-4-(3-tert-butylamino-2-oxopropoxy)-1,2,5-thiadiazole with an equimolecular quantity of maleic acid in tetrahydrofuran]. The mixture is allowed to stand until fermentation subsides, after which the bottle is kept in a 32° C. incubator until all fermentation has ended (in approximately 1–3 days). The yeast is filtered off with addition of diatomaceous earth, and the filtrate is evaporated to dryness to give S-3-morpholino-4β-tert-butylamino-2-hydroxypropoxy)-1,2,5-thiadiazole, m.p. 195°–198° C. (as hydrogen maleate).

The addition of 3-morpholino-4-(3-tert-butylamino-2-oxopropoxy)-1,2,5-thiadiazole hydrogen maleate or other salt to the growth medium containing any one of the bacterial, actinomycetales or fungal reductase identified above produces the same optically active product obtained in example 3.

By replacing the thiadiazole employed in example 3 by an equivalent quantity of a salt, conveniently the hydrogen maleate salt of 1. 3-chloro-4-(3-tert-butylamino-2-oxopropoxy)-1,2,5-thiadiazole,
2. 3-chloro-4-(3-isopropylamino)-2-oxopropoxy)-1,2,5-thiadiazole,
3. 3-ethyl-4-(3-isopropylamino-2-oxopropoxy)-1,2,5-thiadiazole,
4. 3-ethyl-4-(3-tert-butylamino-2-oxopropoxy)-1,2,5-thiadiazole,
5. 3-ethyl-4-[3-(1,1-dimethyl-2-hydroxyethylamino)-2-oxopropoxy]-1,2,5-thiadiazole,
6. 3-ethoxy-4-(3-isopropylamino-2-oxopropoxy)-1,2,5-thiadiazole,
7. 3-ethoxy-4-(3-tert-butylamino-2-oxopropoxy)-1,2,5-thiadiazole,
8. 3-ethoxy-4-[3-(2,2-dimethylpropylamino)-2-oxopropoxy]-1,2,5-thiadiazole,
9. 3-phenyl-4-(3-isopropylamino-2-oxopropoxy)-1,2,5-thiadiazole,
10. 3-phenyl-4-(3-tert-butylamino-2-oxopropoxy)-1,2,5-thiadiazole,
11. 3-benzyl-4-(3-tert-butylamino-2-oxopropoxy-1,2,5-thiadiazole, and following substantially the same procedure described in example 3 or described in the literature for the culture of the bacterial, actinomycetales and fungal reductase with addition of the 2-oxo compounds one to 11 above after good growth is observed and the continuation of the incubation at about 28° C. for an additional 1–3 days, there is obtained the corresponding 2-hydroxypropoxy derivatives of compounds one through 11 above in the sinister configuration.

The 3-X-4-[3-(Y-amino)-2-hydroxypropoxy]-1,2,5-thiadiazole compounds and particularly those obtained in the sinister configuration have been found to exhibit β-adrenergic blocking properties and are thus useful in the management of angina pectoris. Because of this property they are useful for the control of tachycardia that may be drug induced (as by isoproterenol) or brought about by physiological conditions.

These products, particularly in the form of their salts, can be prepared in pharmaceutical formulations suitable for oral or parenteral administration and also can be combined with other active ingredients for simultaneous administration. No special problems are involved in preparing suitable formulations of these active compounds or salts thereof and methods generally employed for this purpose which are known to those skilled in this art are entirely suitable. Dosage units of from about 2 mgs. to about 10 mgs. can be provided for the symptomatic adjustment of dosage of the active substances by the physician depending upon the age and condition of the patient.

Illustrative examples of suitable pharmaceutical compositions containing 3-morpholino-4-(3-tert-butylamino-2-hydroxypropoxy)-1,2,5-thiadiazole hydrogen maleate as active ingredient follow. Each of the compositions are prepared by conventional methods and the quantities recited are for each unit dosage. The other active products prepared as hereinbefore described can be similarly formulated.

INJECTABLE SOLUTION

| | |
|---|---|
| Active compound | 1 mg. |
| Sodium chloride | 9 mg. |
| Distilled water q.s. | 1.0 ml. |

CAPSULES

| | |
|---|---|
| Active compound | 5 mg. |
| Magnesium stearate | 2.0 mg. |
| Lactose U.S.P. | 19.3 mg. |

What is claimed is:

1. A process wherein the ketonic function of a 3-X-4-[3-(Y-amino)-2-oxopropoxy]-1,2,5-thiadiazole is reduced which comprises incubating said thiadiazole with a reductase producing micro-organism selected from *Clostridium butylicum, C. lentoputrescens, Escherichia coli, E. freundii, Aerobacter aerogenes, Mycobacterium lacticola, Bacillus megaterium, Corynebacterium simplex, Salmonella paratyphi, Leuconostoc mesenteroides, Acetobacter ascendens* and *Lactobacillus delbrueckii, Streptomyces lavendulae, S. coelicolor, Saccharomyces Cerevisiae, Geotrichum candidum, Curvularia falcata* and *C. lunata* to provide 3-X-4-[3-(Y-amino)-2-hydroxypropoxy]-1,2,5-thiadiazole wherein in each of the foregoing compounds X is selected from chloro, lower alkyl, lower alkoxy, phenyl, benzyl, morpholino, piperidyl, hydroxypiperidyl and N-lower alkylpiperazinyl and Y is selected from lower alkyl and hydroxy-lower alkyl.

2. A process as claimed in claim 1 wherein 3-morpholino-4-(3-tert-butylamino-2-oxopropoxy)-1,2,5-thiadiazole is employed as the starting ketone.

3. A process as claimed in claim 2 wherein the starting ketone is reduced by incubation in a culture medium containing *Saccharomyces Cerevisiae*.

* * * * *